United States Patent Office 3,534,136
Patented Oct. 13, 1970

3,534,136
M.G. INOCULUM FOR POULTRY
William R. Dunlop, Durham, N.H., assignor to Research Corporation, New York, N.Y., a nonprofit corporation of New York
No Drawing. Continuation-in-part of application Ser. No. 563,953, July 11, 1966. This application Sept. 19, 1969, Ser. No. 859,547
Int. Cl. C12k 1/06, 5/00
U.S. Cl. 424—89                                       3 Claims

ABSTRACT OF THE DISCLOSURE

An inoculum for preventing the hatching egg transmission of chronic respiratory disease in poultry is made by inoculating a tissue cell culture medium containing actively growing embryonic avian kidney cells with M. gallisepticum, incubating the medium to infect the kidney cells with M. gallisepticum, separating the infected cells from the medium, adding the separated infected cells to a second passage level tissue culture medium containing actively growing embryonic avian kidney cells, and incubating the medium inoculated with the infected cells to produce the inoculum.

---

This application is a continuation-in-part of my copending application Ser. No. 563,953, filed July 11, 1966.

This invention relates to the control of diseases in poultry. In one specific aspect, it relates to a method for the inhibition of the hatching egg transmission of poultry diseases.

Certain diseases such as chronic respiratory disease are capable of hatching egg transmission in poultry. Mycoplasma gallisepticum, the causative organism of chronic respiratory disease, passes from the breeding hen via the ovary to the eggs being formed therein, survives the hatching process and can be detected in the newly-hatched fowl.

Chronic respiratory disease has a deleterious effect on carcass quality and accounts for extensive condemnation on poultry inspection lines. In spite of the use of antibiotics, vaccines and other measures to control this disease, it is responsibe for large economic losses to the poultry industry. The disease passes from the breeding stock to newly-hatched fowl via hatching eggs making it extremely difficult to break the chain of transmission and control the disease. Even though over 90% of a breeding flock may be immunized using vaccine, the remaining fowl are still able to perpetuate the disease by transovarian passage to their hatching eggs. A similar situation is obtained when antibiotics are employed instead of vaccine for controlling the disease.

The Mycoplasmas, such as M. gallisepticum, are generally classified between the rickettsiae and the viruses because of their morphology, nutritive requirements and close association with animal tissues. Mycloplasmas are capable of growth in cell-free media and the preparation of antigens for their identification is feasible. When an antigen is introduced into a susceptible host, the host will usually produce an antibody capable of detection by means of a serological test; any detectable antibody present in a breeding fowl can also be detected in her offspring for several days following hatching.

Heretofore, vaccines against chronic respiratory disease in poultry were intended to produce a detectable antibody response in the birds vaccinated. Prior art vaccines, such as that described by Luginbuhl et al. in the Annals of the New York Academy of Sciences 143,234–238 (1965), were prepared from broth cultures of M. gallisepticum or cell cultures inoculated with such broth cultures. As would be expected, not all of the birds vaccinated by prior art methods exhibited a detectable antibody response and the percentage of vaccinated birds with detectable antibodies fell off with time. These two factors particularly complicate the control of chronic respiratory disease, a chronic disease of long duration, since infection or reinfection could occur in birds not possessing protective antibodies. Further, while embryonic transmission of the disease from vaccinated flocks was low, prior art vaccines did not eliminate such transmission.

I have now discovered a novel inoculum made up of live M. gallisepticum microorganisms on or in living animals cells which prevents transovarian passage of the microorganisms. This inoculum, when introduced into a susceptible or an immune breeding fowl, depressed antibody production and serological titer in the breeding fowl and did not produce a passive antibody in the newly-hatched fowl.

It is, therefore, an object of the present invention to provide a novel inoculum consisting of live M. gallisepticum microorganisms associated with living animal cells having the capacity to prevent transovarian passage of the microorganisms.

It is a further object of this invention to provide a method for the prevention of the hatching egg transmission of chromic respiratory disease in poultry.

It is yet another object of the present invention to provide a novel inoculum which, when administered to susceptible or immune fowl, reduces the serum antibody to M. gallisepticum and eventually stabilizes the serological reaction to the negative state in the inoculated fowl.

Broadly speaking, the present invention is an inoculum for stabilizing a disease in the parent flock and preventing its transmission via hatching eggs to the flock's offspring. The microorganism causing the disease is isolated from an infected fowl and grown in an enrichment broth or other suitable nutrient medium. The nutrient medium containing the microorganism is used to inoculate a tissue culture medium containing actively growing animal cells. The resultant infected animal cells are isolated and used to inoculate a fresh batch of tissue culture medium also containing actively growing animal cells. The infected cell culture medium containing living microorganisms is then used to inoculate the flock by administration to individual fowl.

Even though a large portion of the birds in a flock may have already been infected with the disease, their blood antibody titer gradually drops to a low antibody titer on inoculation. After several inoculations the birds in the flock will exhibit a very low or no antibody titer and there will be no clinical evidence of the disease in the inoculated flock. Most important, there is no transfer of the disease to the offspring from such a stabilized flock.

More specifically, my invention is a method for the prevention of the hatching egg transmission of chronic respiratory disease in poultry which comprises inoculating a tissue cell culture medium containing actively growing embryonic avian kidney cells with *M. gallisepticum*, incubating the medium, separating the resultant infected cells from the medium, adding the infected cells to a second passage level culture medium containing actively growing embryonic avian kidney cells, incubating the medium to produce an inoculum, and administering the inoculum to individual fowl in a poultry breeding flock.

There are three basic steps in the production of an inoculum according to the present invention. The first step is to prepare a culture of *M. gallisepticum*. The organism is preferably but not necessarily isolated from the same flock or from a flock in the same general area as the flock to be protected, grown in an enrichment broth or other suitable nutrient medium and tested for purity using conventional methods. The second step is the addition of a portion of the broth culture containing *M. gallisepticum* to a tissue culture medium containing actively growing embryonic avian kidney cells in order to prepare infected cells. The third and unique step of my method is the addition of the harvested infected cells to a fresh batch of tissue culture medium containing actively growing embryonic avian kidney cells and incubation to produce the inoculum.

The enrichment broth utilized for the isolation of *M. gallisepticum* was prepared as follows: Fifty grams of beef heart was infused for 1 hour with about 1000 ml. of water at 50° C. in water bath, heated to 80° C. for 2–4 minutes and filtered while still hot. The filtrate was collected in a filtering flask to which had been added 10 grams of peptone, 10 grams of yeast hydrolysate, 5 grams of dextrose and 5 grams of sodium chloride. The flask was swirled until all the materials had completely dissolved and then cooled to approximately 25° C. The pH was adjusted to 8.3–8.4 with 0.1 N NaOH; approximately 250 ml. of NaOH were required. Phenol red indicator solution containing 0.025 gram of the indicator per liter was added and the contents of the flask mixed well and then heated to a slow rolling boil for 2–3 minutes. The medium was filtered hot and 90 ml. aliquots were dispensed into flasks and sterilized at 121° C. Penicillin (0.1 gm.) and 10 ml. of horse serum or bovine serum fraction were added aseptically after sterilization. The medium was free of precipitate and has a final pH of 7.8–7.9.

The medium was dispensed in 2.5 ml. amounts into previously sterilized serological tubes containing cotton swabs. When making cultures, the trachea of the bird was swabbed vigorously and the swab placed in the culture tube. Several cultures were made from a large number of birds in the flock to be inoculated. The cultures, with the swabs remaining in the broth tube mixture, were incubated at 37° C. for approximately 10 hours. Then 0.7 ml. of the contents from each tube was transferred to 4.5 ml. of fresh enrichment media in sterile metal capped tubes. After 12 to 24 hours, or on a pH change to 6.8 of the phenol red indicator in the medium, 0.5 ml. of the culture was transferred to another tube containing 4.5 ml. of fresh enrichment broth. Broth passages were continued as before governed by pH change until the culture was required for the preparation of inoculum. For best results, the number of broth transfers should be kept at a minimum.

At each transfer, plates were inoculated with 0.1 ml. of the changing broth culture for colony study. The smallest typical colony of *M. gallisepticum* deeply embedded in the agar was selected for cultivation. The plates were prepared using the same general procedure as for the preparation of the enrichment broth except that the addition of phenol red was omitted. Bacto "certified" agar (other grades leave granular material in the finished product) in a concentration of 0.5–0.7%, was added after the second hot filtration with good mixing. After sterilization at 121° C., the medium was cooled to approximately 50° C. Ten percent sterile horse serum was added aseptically and the contents swirled gently to mix; no penicillin or other bacterial inhibitors were added to the agar medium. The medium was poured into small sterile petri dishes and any air bubbles which formed on the surface of the agar plates were eliminated by passing a flame over the surface.

An avian kidney cell culture was prepared as follows: avian kidney cells derived from 16–18 day old chick embryo kidney rudiments were placed in an indented trypsinizing flask with 100 ml. of a 0.125% solution of trypsin in Hanks balanced salt solution. The kidney cell tissues were trypsinized at room temperature for 10 minutes using a magnetic stirrer and the supernatant liquid was discarded. The kidney fragments were again trypsinized and the cells produced on the second trypsinization were strained through cheese cloth. After centrifugation for 10 minutes at $1000 \times g$, the supernatant liquid was discarded. After counting, the cells were seeded into a flask containing 100 ml. of 199 tissue culture nutrient supplemented by 5% calf serum or 5% horse serum, 0.5% Bacto peptone and 0.12% methylcellulose.

The nutrient can be obtained commercially or prepared according to Merchant. The peptone was added as a stock solution containing 10 gm. of peptone dissolved in 100 ml. of balanced salt solution. The methylcellulose was added as a stock solution prepared by suspending 4 gm. of 15 cps. Methocel (methylcellulose) in approximately 30 ml. of balanced salt solution at 90° C. and stirring until the powder was thoroughly wetted. The slurry was cooled to 4° C. and an additional 100 ml. of balanced salt solution, previously chilled to 4° C., was added with shaking. The nutrient containing added peptone and methylcellulose was dispensed in 50 ml. amounts into screw-cap prescription bottles and autoclaved at 120° C. for 15 minutes. (The Methocel boiled vigorously during autoclaving and when removed from the sterilizer has the appearance of coagulated protein.) The autoclaved nutrient was cooled to room temperature and refrigerated at 4° C. overnight. (Methocel becomes more fluid on cooling.) Five ml. of calf serum was added per 100 ml. of nutrient for seeding with avian kidney cells. Five ml. of horse serum was added per 100 ml. of nutrient for inoculation with *M. gallisepticum*.

The tissue culture nutrient medium was initially seeded with $7.5 \times 10^5$ cells/ml. and incubated in a gyratory shaker at 37.5° C. and 84 cycles/min. At the same time, a sample of 0.5 ml. of cells and the nutrient were taken for culture in enrchment broth and agar plates in order to detect any contamination with pleuropneumonia-type organisms.

The suspension cell culture was refed 48–72 hours after seeding. At the same time a new kidney cell suspension cell culture, prepared in the same manner as the first, was started. Twenty-four hours after refeeding the cell culture was inoculated with a broth culture of *M. gallisepticum* and returned to the gyratory shaker at 37.5° C. for another 48 hours. The suspension culture was then centrifuged at $1000 \times g$ for 8 minutes and the supernatant liquid removed. The infected tissue culture cells were then transferred into the as yet uninfected suspension cell culture. (Sufficient nutrient was added to maintain the original cell count of the suspension culture.) Since the latter cell culture had been refed 24 hours previously, it continued in an actively growing state. After forty-eight hours further incubation, the cell culture medium was used for inoculation.

The inoculum was administered to the upper respiratory tract in the general vicinity of the trachea at dosages of 0.5 ml. per bird to flocks in the field containing both *M. gallisepticum* serologically positive and negative birds. When the inoculum was given at two-week intervals, the apparent general health of the flock improved and after the 3rd to 4th inoculation egg production was not depressed. Birds showing a high serological antibody, upon inoculation showed a depression of the antibody. Following the third inoculation in most cases, and beyond the 4th inoculation, no *M. gallisepticum* could be recovered from hatching eggs produced by inoculated breeders. This result was obtained both in the field and in controlled laboratory trials where isolation from noninoculated positive controls was occurring at the rate of 10–15% as shown in the table below:

| Setting number | Time | Pen number | Number eggs set | Number Embryos swabbed | Number positive | Number negative |
|---|---|---|---|---|---|---|
| 1 | Before inoculation | 7, 8, 9, 10 | 180 | 30 | 3 | 27 |
|   |   | 12 | 100 | 10 | 0 | 10 |
| 2 | 2 weeks after 1st inoculation | 8, 9, 10 | 180 | 23 | 8 | 15 |
|   | Positive breeder control | 7 | 120 | 25 | 6 | 19 |
|   | Negative breeder control | 12 | 132 | 5 | 0 | 4 |
| 3 | 2 weeks after 2nd inoculation | 8, 9, 10 | 180 | 29 | 5 | 20 |
|   | Positive breeder control | 7 | 135 | 20 | 0 | 25 |
|   | Negative breeder control | 12 | 135 | 25 | 0 | 20 |
| 4 | 2 weeks after 3rd inoculation | 8, 9, 10 | 180 | 20 | 0 | 28 |
|   | Positive breeder control | 7 | 135 | 20 | 2 | 15 |
|   | Negative breeder control | 12 | 135 | 5 | 0 | 5 |
| 5 | 2 weeks after 4th inoculation | 8, 9, 10 | 180 | 15 | 0 | 15 |
|   | Positive breeder control | 7 | 135 | 25 | 4 | 21 |
|   | Negative breeder control | 12 | 135 | 12 | 0 | 12 |
| 6 | 2 weeks after 5th inoculation | 8, 9, 10 | 180 | 25 | 0 | 25 |
|   | Positive breeder control | 7 | 100 | 20 | 3 | 17 |
|   | Negative breeder control | 12 | 100 | 20 | 0 | 20 |

Serological tests were made on day old chicks of inoculated and uninoculated breeders. In no case were there any positive results from the negative control group (Pen 12). The positive control group showed positives through the sixth hatch except for the fourth hatch which contained a large number of infertile eggs and did not provide an adequate sample for testing. In comparing the control breeders progeny with the inoculated breeders' progeny, passively transferred antibody occurs until the third hatch in the inoculated group. Beyond the third hatch the chicks coming from inoculated breeders were serologically negative.

Some 400 breeders were used in the field test. There were 12 hatches from the flock with a total of 1749 hatched chicks. Similar to laboratory trials, no positive serology was obtained beyond the 4th hatch. These chicks were placed on 4 farms and at 11 weeks and 18 weeks the serological test on all chickens were negative.

No inoculum or other treatment was given to the hatched chicks. Cull chicks from second generation hatching eggs gave negative serological tests. Nor did the continuous piped embryo test commonly used for the detection purposes in the field show any evidence of the disease organism. Similar results were obtained in the third generation. A total of well over 10,000 birds was involved in the field test.

I claim:

1. A method for the preparation of an inoculum capable of preventing the hatching egg transmission of chronic respiratory disease in poultry caused by *M. gallisepticum*, which comprises inoculating a tissue cell culture medium containing actively growing embryonic avian kidney cells with *M. gallisepticum*, incubating the medium to infect the kidney cells with *M. gallisepticum*, separating the infected cells from the medium, adding the separated infected cells to a second passage level tissue culture medium containing actively growing embryonic avian kidney cells, and incubating the medium inoculated with the infected cells to produce the inoculum.

2. The inoculum containing second passage cells infected with *M. gallisepticum* prepared by the method of claim 1.

3. A method for the prevention of the hatching egg transmission of chronic respiratory disease in poultry caused by *M. gallisepticum* which comprises intratracheally administering to individual fowl in a poultry breeding flock repeated doses at intervals of an inoculum, said inoculum being prepared according to the method of claim 1.

References Cited

Lugin Buhl et al.: Annals N.Y. Acad. Sci. 143: 234–238 (1965), "Mycoplasma Gallisepticum—Control by Immunization."

Dunlop et al.: Poult. Sci. 45:1081 (September 1966) "The Influence of Tissue Culture Mycoplasma on Transovarian Transmission of *M. Gallisepticum*."

Kottaridis et al.: Avian Diseases 12(4):538–531 (November 1967) "Tissue-Culture Propagated Mycoplasma for the Control of Chronic Respiratory Disease."

SHEP K. ROSE, Primary Examiner

U.S. Cl. X.R.

195—1.3